Sept. 15, 1964  D. ALTER  3,148,715

EDGING SEPARATOR

Filed Oct. 20, 1960

INVENTOR.
DALE ALTER
BY Leslie C. Noller
John M. Crawford
ATTORNEYS

United States Patent Office 3,148,715
Patented Sept. 15, 1964

3,148,715
EDGING SEPARATOR
Dale Alter, Klamath Falls, Oreg., assignor to Weyerhaeuser Company, Tacoma, Wash., a corporation of Washington
Filed Oct. 20, 1960, Ser. No. 63,833
11 Claims. (Cl. 143—157)

This invention relates to a device for separating two objects and specifically relates to a device for separating edgings from adjacent boards.

A slab-board that has been cut from a log has wane, or rounded edges which are usually tapered. These slab-boards then have their edges removed as a first step in forming the typical common board with parallel sides. Once the edgings are sawed from the board in the edger, there is the problem of separating the edgings and the board since the subsequent manufacturing steps and the end products involved will not be the same.

This separation may be effected in a number of ways. The simplest way is manual separation in which a person stands over the lumber coming from the edger and pushes the edgings onto a second conveyor system. An objection to this method is that it is expensive.

Another way is to use a mechanical separating bar or sheath that guides the edgings onto a second conveyor system. This bar is aligned with one of the edger saws and must be realigned whenever the saw is adjusted for a new width. This method is also expensive.

Another way is a gravity fall method of separation. In this system the board is placed on a narrow conveyor belt and is held on the belt by some type of weight. This may be another conveyor belt or a series of press rollers. The belt is narrower than the board so that the edgings are unsupported and will fall onto a lower conveyor. The main difficulty with this system is the need to align the board with the belt. A belt that is wide enough to minimize the alignment difficulties is usually too wide to handle the narrower widths of board.

Since this latter system is simple, efficient and economical, it is desirable to provide a separator for narrower widths that will work in conjunction with that system and which will also be quick, economical and efficient, or which may be used alone.

It is an object of this invention to provide an apparatus for separating edgings from board which is rapidly responsive to changes in the width of the board.

It is a further object of this invention to provide apparatus for separating edgings from board in which the apparauts is economical of manufacture and use.

These and other objects of this invention will become apparent from a discussion of the attached drawings.

Figure 1:
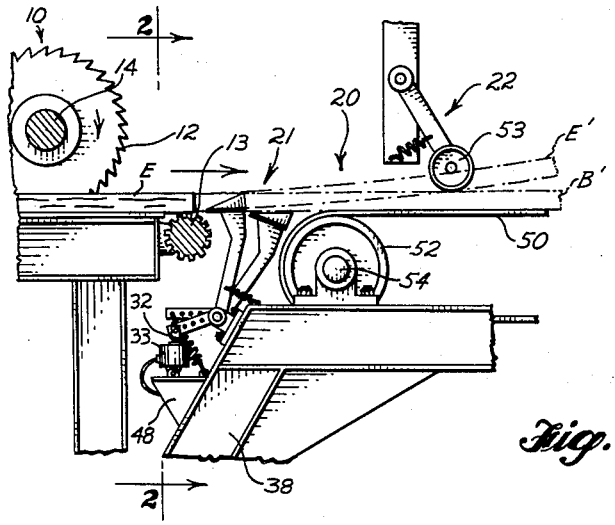
FIGURE 1 is a side view of the apparatus.
Figure 2:
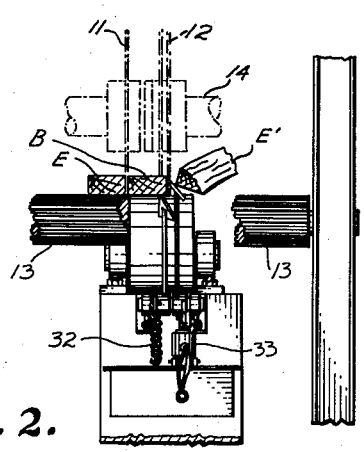
FIGURE 2 is a view of the apparatus taken along line 2—2 of FIGURE 1.
Figure 4:
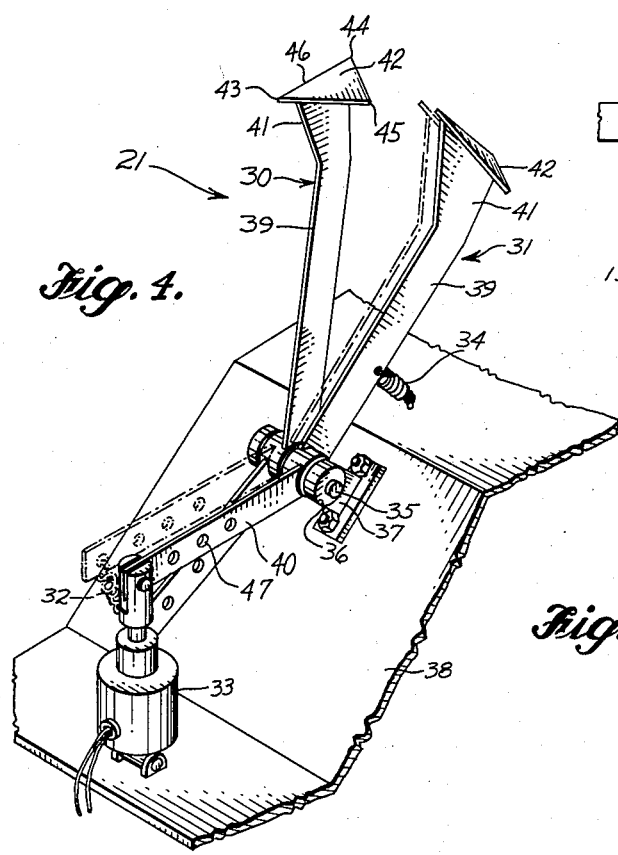
FIGURE 4 is an isometric view of the separating or shear members.
Figure 3:
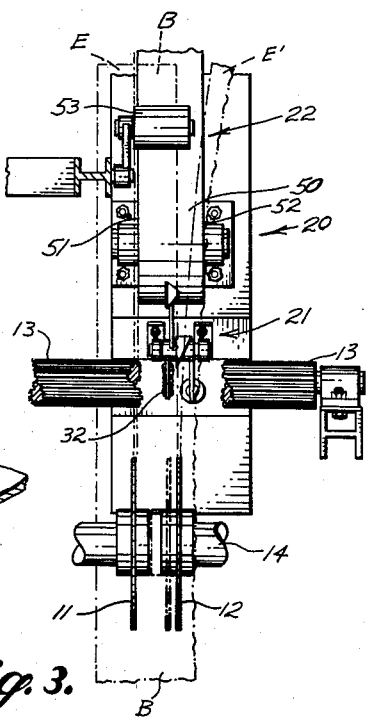
FIGURE 3 is a top plan view of the apparatus.

A conveyor carries board B to an edge 10 having saws 11 and 12 mounted on shaft 14. The board is aligned with fixed saw 11 for an edging cut along one side. Adjustable saw 12 is then aligned with the opposite edge of the board for the edging cut on that side. The adjustable saw usually has stops at two inch increments so as to provide boards having widths of four inches, six inches, eight inches or more depending on the maximum useable width of the board.

Board B, passing longitudinally through edger 10, is divided into three parts by saws 11 and 12. These are edgings E and E', and parallel sided board B'. Board B', which goes on to other finishing operations, must now be separated from edgings E and E', which may be used in other products.

A separator 20 is provided for this purpose. Edger outfeed rolls 13 convey board B' and edgings E and E' to the front section 21 of the separator which removes edgings E' from board of four inch and six inch widths. The boards and remaining edgings then pass through the rear section 22, which removes any edgings that are not removed in the front section.

The front section 21 comprises a pivotable shear member 30 for handling boards of four inch width, and a pivotable shear member 31 for handling boards of a six inch width. Shear member 30 is biased by a spring or weight 32 so that it will be in an upright position when a kerf or saw cut is above it, but will be held down in a lowermost position when a board B' of six inch or greater width rides over it. In this manner it will separate edgings from boards of four inch width but remain out of the way when wider boards appear. Shear member 31 is actuated by solenoid 33, which is operated by a switch at the six inch position of saw 12, and only comes into upright position for boards B' having six inch widths. At all other times it is biased into a lowermost position by spring 34 and the lumber rides over it.

Aside from the method of actuation described above and their angle of shear to be described later, the shear members are identical.

Each has a shaft 35 which is pivotably journaled in a bearing 36 of bearing member 37 which is mounted on an inclined base member 38. Each comprises an upper arm 39 and a lower arm 40 extending from opposite sides of shaft 35. The arms are angularly oriented to each other. Upper arm 39 terminates in an enlarged head portion 41 which is also angularly oriented to the upper arm. Attached to head portion 41 by welding or other means is a triangular shaped shear head 42 having a forward apex 43, an upper apex 44 and a lower apex 45. An upper side 46 extends between apexes 43 and 44. The placement of shear head 42 is such that apexes 43 and 44 and upper side 46 are aligned with the kerf, while lower apex 45 extends outwardly of the kerf. This shear head 42 presents a plane, intersecting the kerf, which will force edging E' outwardly and upwardly of board B'. The angular placement of the shear head on shear member 30 is greater than on shear member 31 because of the greater distance that the edgings must be moved.

The lower arm 40 of each of the shear members has a series of holes 47 therein for the attachment of the spring 32 or the solenoid 33. Solenoid 33 is mounted on platform 48 which forms a portion of base member 38. Extending between base member 38 and upper arm 39 of shear member 31 is tension spring 34 which tends to keep this shear member in its lowermost position.

Following this first section 21 of the separator is a second section 22 for separating edgings E and edgings E' from eight inch or wider boards. This section comprises a conveyor belt 50 having sides 51 and 52, and overhead roller members 53 for holding a board B' on the belt. Belt 50 is the width of an eight inch board and is in line with the path of travel of an eight inch board. Its side 51 is aligned with fixed saw 11 so that the edgings E, cut by saw 11, will be without support beyond edger outfeed rolls 14 and thus fall by gravity onto another conveyor system which removes them.

Side 52 of the belt is in line with the eight inch position of saw 12 so that any edging E' cut from a board B', having a width of eight inches or more, will also fall onto the other conveyor. If it is found that the edgings may strike bearings 54 of drive rolls 55, then a suitable guard may be provided.

While a specific example of a preferred form of the above invention has been described, it will be apparent that many changes and modifications may be made in the apparatus without departing from the spirit of the invention. It should, therefore, be understood that the above description is illustrative only and is not intended to limit the scope of the invention.

What is claimed is:

1. Apparatus for separating objects that are separable longitudinally of their direction of travel comprising
    pivotable means having a separating surface thereon,
    said pivotable means having a first position in which said separating surface is in the path of travel of said objects passing thereby and a second position in which said separating surface is not in the path of travel of objects passing thereby,
    said pivotable means being biased into said first position whereby said pivotable means will be in said first position when said objects are separable along a line that is aligned with said separating surface and will be moved into said second position by an object when said objects are not separable along a line that is aligned with said separating surface,
    said separating surface being tilted forwardly and outwardly whereby said pivotable means may be moved into the second position by an oject aligned with it and said surface will move an object outwardly are separable by said surface.

2. The apparatus of claim 1 in which said separating surface is of a triangular configuration and the edge of said separating surface adjacent said objects is aligned with said line of separation of said objects.

3. Apparatus for separating objects that are separable longitudinally of their direction of travel comprising
    a number of pivotable means, each having a separating surface thereon,
    each of said pivotable means having a first position in which said separating surface is in the path of travel of said objects passing thereby and a second position in which said separating surface is not in the path of travel of objects passing thereby,
    one of said pivotable means being biased into said first position whereby said one pivotable means will be in said first position when said objects are separable along a line that is aligned with said separating surface of said one pivotable means and will be moved into said second position by an object when said objects are not separable along a line that is aligned with said separating surface of said one pivotable means,
    the remainder of said pivotable means being biased into said second position,
    and means for raising each of said remainder of said pivotable means into said first position,
    said separating surface being tilted forwardly and outwardly whereby said pivotable means may be moved into the second position by an object aligned with it and said surface will move an object outwardly if objects are separable by said surface.

4. Apparatus for separating objects that are separable longitudinally of direction of travel comprising
    a base member having a bearing attached thereto,
    a pivotable member having a shaft which extends through said bearing,
    said pivotable member having a separating surface on its outermost end,
    said pivotable member having a first position in which said separating surface is in the path of travel of said objects passing thereby and a second position in which said separating surface is not in the path of travel of objects passing thereby,
    said pivotable member being biased into said first position whereby said pivotable member will be in said first position when said objects are separable along a line that is aligned with said separating surface and will be moved into said second position by an object when said objects are not separable along a line that is aligned with said separating surface,
    said separating surface being tilted forwardly and outwardly whereby said pivotable member may be moved into the second position by an object aligned with it and said surface will move an object outwardly if objects are separable by said surface.

5. The apparatus of claim 4 in which said pivotable member comprises
    a pair of arms extending outwardly from said shaft, and angularly displaced with respect to each other,
    one of said arms having said separating surface thereon, and said pivotable member being biased into said first position by means attached to the other of said pair of arms.

6. Apparatus for separating objects that are separable longitudinally of their direction of travel comprising
    a base member having a bearing attached thereto,
    a number of pivotable members mounted on a shaft which extends through said bearing,
    each of said pivotable members having a separating surface on its outermost end,
    each of said pivotable members having a first position in which said separating surface is in the path of travel of said objects passing thereby and a second position in which said separating surface is not in the path of travel of the objects passing thereby,
    one of said pivotable members being biased into said first position whereby said one pivotable member will be in said first position when said objects are separable along a line that is aligned with said separating surface of said one pivotable member and will be moved into said second position by an object when said objects are not separable along a line that is aligned with said separating surface of said one pivotable member,
    the remainder of said pivotable members being biased into said second position,
    and means for raising each of said remainder of said pivotable members into said first position,
    each of said separating surfaces being tilted forwardly and outwardly whereby said one pivotable member may be moved into the second position by an object aligned with it and each of said surfaces will move an object outwardly if objects are separable by said surface.

7. The apparatus of claim 6 in which each of said pivotable members comprises
    a pair of arms extending outwardly from said shaft and angularly displaced with respect to each other,
    one of said arms of each pivotable member having said separating surface thereon,
    said one pivotable member being biased into said first position by means attached to the other of said pair of arms,
    each of the remainder of said pivotable members being biased into said second position by means attached to one of said arms, and being moved into said first position by means attached to the other of said arms.

8. In a slab-board edging and separating apparatus comprising cutting means for cutting the edgings from the boards and gravity separating means for separating said edgings from said boards the improvement comprising
    pivotable means for removing edgings from boards, said pivotable means comprising
    a base member having a bearing attached thereto,
    a pivotable member having a shaft which extends through said bearing,
    said pivotable member having a separating surface on its outermost end,
    said pivotable member having a first position in which said separating surface is in the path of travel of said objects passing thereby and a second position in which said separating surface is not in the path of travel of objects passing thereby, said pivotable member being biased into said first position whereby said pivotable member will be in said first position when said objects are separable along a line that is aligned with said separating surface and will be moved into said second position by an object when said objects are not separable along a line that is aligned with said separating surface, said separating surface being tilted forwardly and outwardly whereby said pivotable member may be moved into the second position by an object aligned with it and said surface will move an object outwardly if objects are separable by said surface.

9. The apparatus of claim 8 in which said pivotable member comprises a pair of arms extending outwardly from said shaft and angularly displaced with respect to each other, one of said arms having said separating surface thereon, and said pivotable member being biased into said first position by means attached to the other of said pair of arms.

10. In a slab-board edging and separating apparatus comprising cutting means for cutting the edgings from the boards and gravity separating means for separating said edgings from said board the improvement comprising pivotable means for removing edging from boards, said pivotable means comprising a base member having a bearing attached thereto, a number of pivotable members mounted on a shaft which extends through said bearing, each of said pivotable members having a separating surface on its outermost end, each of said pivotable members having a first position in which said separating surface is in the path of travel of said objects passing thereby and a second position in which said separating surface is not in the path of travel of objects passing thereby, one of said pivotable members being biased into said first position whereby said one pivotable member will be in said first position when said objects are separable along a line that is aligned with said separating surface of said one pivotable member and will be moved into said second position by an object when said objects are not separable along a line that is aligned with said separating surface of said one pivotable member, the remainder of said pivotable members being biased into said second position, and means for raising each of said remainder of said pivotable members into said first position, each of said separating surfaces being tilted forwardly and outwardly whereby said one pivotable member may be moved into the second position by an object aligned with it and each of said surfaces will move an object outwardly if objects are separable by said surface.

11. The apparatus of claim 10 in which each of said pivotable members comprises a pair of arms extending outwardly from said shaft and angularly displaced with respect to each other, one of said arms of each pivotable member having said separating surface thereon, said one pivotable member being biased into said first position by means attached to the other of said pair of arms, each of the remainder of said pivotable members being biased into said second position by means attached to one of said arms, and being moved into said first position by means attached to the other of said arms.

References Cited in the file of this patent
UNITED STATES PATENTS

| | | |
|---|---|---|
| 1,867,873 | Browne | July 19, 1932 |
| 1,920,584 | Osterberg | Aug. 1, 1933 |
| 2,109,812 | Whitefield | Mar. 1, 1938 |
| 2,793,662 | Oholm | May 28, 1957 |
| 2,821,301 | Montague | Jan. 28, 1958 |
| 2,863,573 | Von Sneidern | Dec. 9, 1958 |